United States Patent
Fukui et al.

(10) Patent No.: US 12,122,339 B2
(45) Date of Patent: Oct. 22, 2024

(54) COLLISION AVOIDANCE SUPPORT DEVICE FOR A VEHICLE AND COLLISION AVOIDANCE SUPPORT PROGRAM FOR A VEHICLE

(71) Applicant: TOYOTA JIDOSHA KABUSHIKI KAISHA, Toyota (JP)

(72) Inventors: Yusuke Fukui, Toyota (JP); Yuzo Kaneshige, Toyota (JP); Takashi Moriya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 17/895,650

(22) Filed: Aug. 25, 2022

(65) Prior Publication Data
US 2023/0061982 A1 Mar. 2, 2023

(30) Foreign Application Priority Data
Aug. 30, 2021 (JP) .................. 2021-139695

(51) Int. Cl.
*G06F 17/00* (2019.01)
*B60T 7/22* (2006.01)

(52) U.S. Cl.
CPC .............. *B60T 7/22* (2013.01); *B60T 2210/12* (2013.01); *B60T 2230/06* (2013.01)

(58) Field of Classification Search
CPC .... B60T 7/22; B60T 2210/12; B60T 2230/06; B60T 7/20; B60T 8/1708; B60T 8/17558; B60T 2201/022
USPC ........................................................ 701/41
See application file for complete search history.

(56) References Cited

U.S. PATENT DOCUMENTS

| 4,232,910 | A | * | 11/1980 | Snyder | B60T 8/1708 303/123 |
| 5,582,275 | A | * | 12/1996 | Arnold | F16D 55/00 188/164 |
| 5,757,949 | A | * | 5/1998 | Kinoshita | B60K 28/10 701/1 |
| 5,758,305 | A | | 5/1998 | Otsubo | |
| 7,690,737 | B2 | * | 4/2010 | Lu | B60T 8/246 303/146 |

(Continued)

FOREIGN PATENT DOCUMENTS

| DE | 102017117472 A1 * | 2/2018 | ............. B60K 28/06 |
| JP | H8-121582 A | 5/1996 | |

(Continued)

OTHER PUBLICATIONS

Federal Motor Vehicle Safety Standards: Heavy Vehicle Antilock Brake System (ABS) Performance Requirement (Year: 2003).*

Primary Examiner — Ronnie M Mancho
(74) Attorney, Agent, or Firm — Dinsmore & Shohl LLP

(57) ABSTRACT

A collision avoidance support device for a vehicle that includes an obstacle detection device for detecting an obstacle in front of the vehicle and an electronic control unit configured to perform automatic brake control that automatically applies braking force to a vehicle when it is determined that the obstacle detection device have detected an obstacle and the vehicle may collide with the obstacle, and the electronic control unit is configured to prohibit the automatic brake control when the vehicle is towing a trailer and a friction coefficient of a road surface is determined to be lower than a standard value.

5 Claims, 6 Drawing Sheets

(56) References Cited

U.S. PATENT DOCUMENTS

| | | | |
|---|---|---|---|
| 7,950,751 B2* | 5/2011 | Offerle | B60T 8/1708 |
| | | | 303/193 |
| 8,380,416 B2* | 2/2013 | Offerle | B60W 30/045 |
| | | | 477/182 |
| 8,548,709 B2* | 10/2013 | Morita | B60W 30/16 |
| | | | 701/96 |
| 9,105,190 B2 | 8/2015 | Akiyama | |
| 9,393,960 B2 | 7/2016 | Kodaira | |
| 9,483,945 B2 | 11/2016 | Okita | |
| 9,571,449 B2* | 2/2017 | Obradovich | B60W 10/20 |
| 9,873,412 B2 | 1/2018 | Moriizumi | |
| RE46,828 E* | 5/2018 | Spillane | B60K 35/10 |
| 10,220,825 B2* | 3/2019 | Otake | B60W 10/18 |
| 10,328,921 B2* | 6/2019 | Fraser | B60T 7/22 |
| 10,793,147 B2 | 10/2020 | Kaminade | |
| 10,994,724 B2* | 5/2021 | Matsumura | B60W 40/08 |
| 11,220,245 B2* | 1/2022 | Krasnoff | F16D 63/008 |
| 11,518,372 B2* | 12/2022 | Ikeda | B60W 30/09 |
| 2006/0076828 A1* | 4/2006 | Lu | B62D 15/027 |
| | | | 303/146 |
| 2017/0210371 A1* | 7/2017 | Fraser | B60T 17/22 |
| 2017/0297573 A1* | 10/2017 | Fraser | B60W 30/143 |
| 2018/0037214 A1* | 2/2018 | Otake | B60W 40/105 |
| 2019/0014396 A1 | 5/2019 | Yasuhiko | |
| 2020/0207352 A1 | 7/2020 | Ogawa | |
| 2020/0262420 A1* | 8/2020 | Ikeda | B60W 40/04 |
| 2021/0061309 A1 | 3/2021 | Kawanai | |
| 2021/0107521 A1 | 4/2021 | Fujita | |
| 2021/0107528 A1 | 4/2021 | Fujita | |
| 2021/0146956 A1 | 5/2021 | Fujita | |
| 2021/0146958 A1 | 5/2021 | Tanaka | |
| 2021/0221362 A1* | 7/2021 | Matsumura | B60W 30/143 |
| 2022/0176923 A1 | 6/2022 | Henderson | B60G 17/0195 |
| 2022/0274591 A1* | 9/2022 | Ike | B60T 8/17558 |
| 2023/0061982 A1* | 3/2023 | Fukui | B60T 7/20 |
| 2023/0063729 A1* | 3/2023 | Fukui | B60W 30/0953 |

FOREIGN PATENT DOCUMENTS

| | | | | |
|---|---|---|---|---|
| JP | 2017-191383 A | | 10/2017 | |
| JP | 2020-083168 A | | 4/2020 | |
| JP | 2020-135677 A | | 8/2020 | |
| JP | 2023033791 A | * | 3/2023 | B60T 7/22 |
| WO | 2019/073513 A1 | | 4/2019 | |

* cited by examiner

COLLISION AVOIDANCE SUPPORT DEVICE FOR A VEHICLE AND COLLISION AVOIDANCE SUPPORT PROGRAM FOR A VEHICLE

CROSS-REFERENCE TO RELATED APPLICATION

This application claims priority to Japanese Patent Application No. JP2021-139695 filed on Aug. 30, 2021, the content of which is hereby incorporated by reference in its entirety into this application.

BACKGROUND

1. Technical Field

The present disclosure relates to a collision avoidance support device for a vehicle and a collision avoidance support program fora vehicle.

2. Description of the Related Art

For example, as described in Japanese Patent Application Laid-Open No. 2020-135677, a collision avoidance support device is known as one of driving support devices for vehicles such as automobiles. The collision avoidance support device warns a driver when an obstacle that may cause a collision is detected in front of a vehicle, and when the possibility of collision becomes higher, the collision avoidance support device executes collision avoidance support control to prevent the vehicle from colliding with the obstacle by automatic brake control.

According to the collision avoidance support device, when there is an obstacle in front of an own vehicle that may cause a collision, it is possible to alert a driver by an alarm and prevent the own vehicle from colliding with the obstacle by automatic deceleration by the automatic brake control.

A vehicle such as an automobile may tow a trailer, and even in a situation where a vehicle is towing a trailer, if there is an obstacle in front of the vehicle that may cause a collision, it is conceivable to execute collision avoidance support control so that the vehicle can avoid colliding with the obstacle.

However, in a situation where a vehicle is towing a trailer, if the vehicle is suddenly decelerated by automatic brake control by collision avoidance support control, the vehicle is pushed from behind by the trailer, and a jackknifing phenomenon may occur in which a crossing angle of longitudinal centerlines of the vehicle and the trailer becomes excessive. The collision of the vehicle with an obstacle may be avoided by a steering operation, but the jackknifing phenomenon is an unfavorable phenomenon that cannot be avoided by the steering operation and progresses rapidly. Therefore, when collision avoidance support control is performed in a situation where a vehicle is towing a trailer, it is necessary to prevent a jackknifing phenomenon caused by the automatic brake control by the collision avoidance support control.

SUMMARY

The present disclosure provides a collision avoidance support device and a collision avoidance support program improved so that a jackknifing phenomenon does not occur due to an automatic brake control by a collision avoidance support control in a situation where a vehicle is towing a trailer.

According to the present disclosure, a collision avoidance support device for a vehicle is provided, including an obstacle detection device that detects an obstacle in front of a vehicle and an electronic control device configured to perform automatic brake control to apply braking force automatically to the vehicle when it is determined that an obstacle is detected by the obstacle detection device and the vehicle may collide with the obstacle.

The electronic control unit is configured to prohibit the automatic brake control when it is determined that the vehicle is towing a trailer and a friction coefficient of a road surface is lower than a standard value.

According to the present disclosure, a collision avoidance support program for a vehicle is provided that causes an electronic control unit mounted on a vehicle to execute a step of detecting an obstacle in front of the vehicle by an obstacle detection device and a step of performing automatic brake control that automatically applies braking force to the vehicle when it is determined that an obstacle is detected by the obstacle detection device and the vehicle may collide with the obstacle.

The collision avoidance support program includes a step of determining whether the vehicle is towing a trailer, a step of determining whether a coefficient of friction of a road surface is lower than a standard value, and a step of prohibiting the automatic brake control when it is determined that the vehicle is towing a trailer and a friction coefficient of the road surface is lower than the standard value.

According to the above-mentioned collision avoidance support device and collision avoidance support program, when it is determined that the vehicle is towing a trailer and a friction coefficient of the road surface is lower than the standard value, the automatic brake control is prohibited, so that the vehicle is not decelerated. Therefore, it is possible to avoid a jackknifing phenomenon caused by the vehicle being pushed from behind by the trailer. The standard value of the friction coefficient of the road surface in the present application may be a friction coefficient of a standard road surface, that is, a friction coefficient of a dry asphalt road surface.

In one aspect of the present disclosure, the electronic control unit is configured to prohibit the automatic brake control when it is determined that the vehicle is towing a trailer, a magnitude of a hitch angle is equal to or larger than a hitch angle reference value, and the friction coefficient of the road surface is lower than the standard value.

In a situation where the vehicle is towing a trailer, a jackknifing phenomenon is likely to occur not only when the friction coefficient of the road surface is lower than the standard value, but also when the vehicle is turning, in other words, when a hitch angle is large.

According to the above aspect, the automatic brake control is prohibited when it is determined that the vehicle is towing a trailer, the magnitude of the hitch angle is equal to or larger than a hitch angle reference value, and the friction coefficient of the road surface is lower than the standard value. Therefore, when the vehicle is going straight, which is unlikely to cause a jackknifing phenomenon, it is possible to avoid a collision with an obstacle by decelerating the vehicle by the automatic brake control, and when the vehicle is turning, it is possible to avoid the jackknifing phenomenon caused by a deceleration of the vehicle by the automatic brake control.

In another aspect of the present disclosure, the electronic control unit is configured to determine that the friction coefficient of the road surface is lower than the standard value when anti-skid control is executed on two or more wheels except a combination of only the a left front wheel and a right front wheel and a deceleration of the vehicle is lower than a deceleration reference value.

In a situation where the vehicle tows a trailer, the vehicle receives a rearward force from the trailer, and a rearward moment acts on the vehicle around ground contact points of the rear wheels, reducing ground contact loads of the left and right front wheels so that anti-skid control is more likely to be performed on the front wheels than on the rear wheels. As a result, when a friction coefficient of a road surface is determined based on whether the left and right front wheels are under anti-skid control, even though the friction coefficient of the road surface is not lower than the standard value, it may be erroneously determined that the friction coefficient of the road surface is lower than the standard value. In addition, in a situation where a friction coefficient of a road surface is low, even if braking force is applied to the wheels to the extent that anti-skid control is executed on two or more wheels, a deceleration of the vehicle is smaller than when the friction coefficient of the road surface is the standard value.

According to the above aspect, when anti-skid control is executed for two or more wheels excluding a combination of only a left front wheel and a right front wheel and a deceleration of the vehicle is lower than the reference value, it is determined that the friction coefficient of the road surface is lower than the standard value. Therefore, it is possible to prevent determination that the friction coefficient of the road surface is lower than the standard value from being erroneously made due to the determination of the friction coefficient of the road surface based on whether the left front wheel and the right front wheel are under anti-skid control. Further, it is possible to reduce the possibility that the friction coefficient of the road surface is erroneously determined to be lower than the standard value, as compared to where the deceleration of the vehicle is not taken into consideration.

Further, in another aspect of the present disclosure, the two or more wheels include at least two wheels in diagonal positions.

According to the above aspect, the two or more wheels include at least two wheels in diagonal positions, namely the left front wheel and the right rear wheel or the right front wheel and the left rear wheel. Therefore, compared to where the friction coefficient of the road surface is determined to be lower than the standard value when the anti-skid control is executed on the front and rear wheels on the left or right side, it is possible to determine whether or not the friction coefficient of the road surface is lower than the standard value for a wider road surface.

Other objects, other features and attendant advantages of the present disclosure will be readily understood from the description of the embodiments of the present disclosure described with reference to the following drawings.

DETAILED DESCRIPTION

The embodiment of the present disclosure will now be described in detail with reference to the accompanying drawings.

Embodiment

Figure 1:
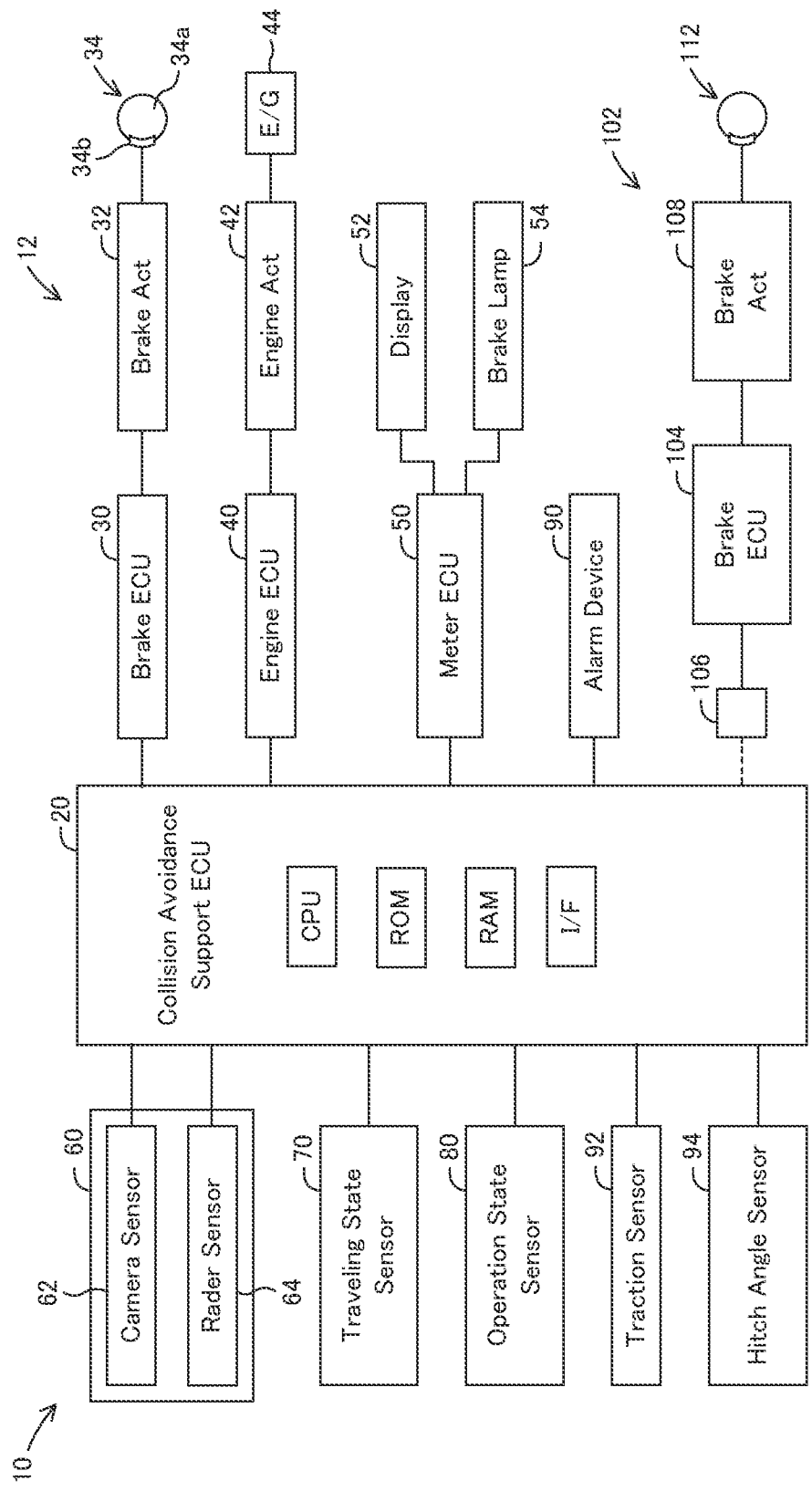
FIG. 1 is a schematic configuration diagram showing an embodiment of a vehicle collision avoidance support device for a vehicle according to the present disclosure.

As shown in FIG. 1, the vehicle collision avoidance support device 10 according to the embodiment is adapted to a vehicle 12 (referred to as "own vehicle" as necessary to distinguish it from other vehicles). The collision avoidance support device 10 includes a collision avoidance support ECU 20 and a brake ECU 30, and the vehicle 12 includes an engine ECU 40 and a meter ECU 50.

These ECUs are electronic control units each having a microcomputer as a main part, and are connected to each other so as to be able to transmit and receive information via a CAN (Controller Area Network) (not shown). Although not shown in FIG. 1, the microcomputer includes a CPU, a ROM, a RAM, a non-volatile memory, an interface I/F, and the like. Each CPU realizes various functions by executing instructions (programs, routines) stored in the ROM. Some or all of these ECUs may be integrated into one ECU.

The collision avoidance support ECU 20 gives an alarm to a driver when an obstacle is detected in front of the own vehicle, and executes collision avoidance support control to prevent the own vehicle from colliding with the obstacle by automatic brake control when the possibility of collision becomes higher. Since the collision avoidance support control is generally called PCS control (pre-crash safety control), the collision avoidance support control is hereinafter called PCS control.

An obstacle detection device 60, a traveling state sensor 70, an operation state sensor 80, an alarm device 90, a traction sensor 92, and, a hitch angle sensor 94 are connected to the collision avoidance support ECU 20. In the embodiment, the obstacle detection device 60 and the like are connected to the collision avoidance support ECU 20, but at least one of them may be connected to the CAN. The alarm device 90 may be any of an alarm device that issues a visual alarm such as an alarm lamp, an alarm device that issues an auditory alarm such as an alarm buzzer, and an alarm device that issues a bodily alarm such as vibration of a seat, and may be any combination thereof.

In the present embodiment, the obstacle detection device 60 includes a camera sensor 62 and a radar sensor 64. The camera sensor 62 is arranged in the upper part of the front window in a vehicle interior, and captures scenery in front of the vehicle 12. The camera sensor 62 recognizes a white line on a road and a three-dimensional object existing in front of the vehicle 12 based on the captured image, and supplies the information (white line information, three-dimensional object information) to the collision avoidance support ECU 20 at a predetermined cycle. The white line information is information indicating a shape of the white line and a relative positional relationship between the vehicle 12 and the white line. The three-dimensional object information is information indicating a type of the three-dimensional object detected in front of the vehicle 12, a size of the three-dimensional object, a relative positional relationship of the three-dimensional object with respect to the vehicle, and the like. The recognition of the type of a three-dimensional object is realized by machine learning such as pattern matching, for example.

The radar sensor 64 is provided in the center of the front of a vehicle body and detects a three-dimensional object existing in the front region of the vehicle 12. The radar sensor 64 emits radio waves in the millimeter wave band (hereinafter referred to as "millimeter wave") and receives millimeter waves (that is, reflected waves) reflected by a three-dimensional object (for example, another vehicle, pedestrian, bicycle, building, etc.) existing in a radiation range. The radar sensor 64 calculates a distance between the vehicle 12 and a three-dimensional object, a relative speed of the vehicle with respect to the three-dimensional object, a relative position (direction) of the three-dimensional object with respect to the vehicle, and the like based on a phase difference between the transmitted millimeter wave and the received reflected wave, an attenuation level of the reflected wave, a time from the transmission of the millimeter wave to the reception of the reflected wave, and the like, and supplies information (three-dimensional object information) representing calculation results to the collision avoidance support ECU 20 at a predetermined cycle.

The collision avoidance support ECU 20 synthesizes the three-dimensional object information supplied from the camera sensor 62 and the three-dimensional object information supplied from the radar sensor 64 to acquire highly accurate three-dimensional object information. Therefore, the camera sensor 62 and the radar sensor 64 function as an obstacle detection device 60 for detecting an obstacle in front of the vehicle 12.

The traveling state sensor 70 is, for example, a wheel speed sensor that detects a wheel speed of each wheel of the vehicle 12, a longitudinal acceleration sensor that detects a longitudinal acceleration Gx of the vehicle, a lateral acceleration sensor that detects a lateral acceleration of the vehicle, and a yaw rate sensor that detects a yaw rate of the vehicle.

The operation state sensor 80 is a sensor and a switch for detecting an operation performed by the driver. Although not shown in FIG. 1, the operation state sensor 80 includes an accelerator operation amount sensor that detects an amount of depression of an accelerator pedal (accelerator opening), and a brake operation amount sensor that detects a depression force on a brake pedal or a master cylinder pressure. Further, the operation state sensor 80 includes a steering angle sensor that detects a steering angle θ corresponding to a steering operation amount, a steering torque sensor that detects a steering torque, a blinker switch that detects an operating state of a blinker, and a shift position sensor that detects a shift position of a transmission and the like.

Figure 2:
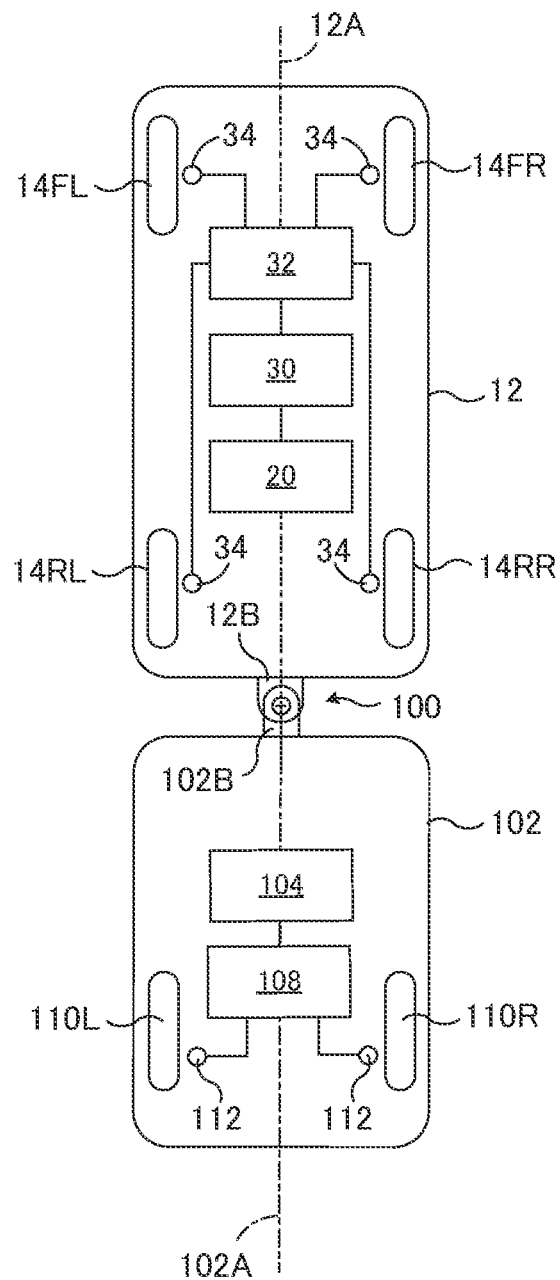
FIG. 2 is a diagram showing a situation in which a vehicle is towing a trailer and traveling straight.
Figure 3:
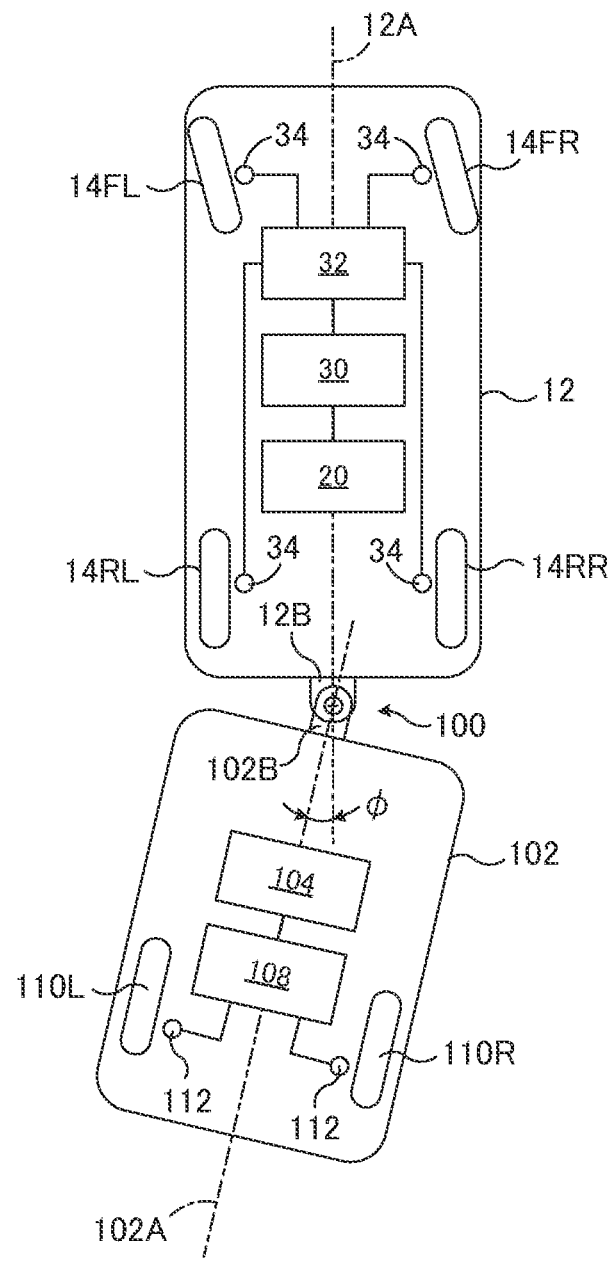
FIG. 3 is a diagram showing a situation in which a vehicle is towing a trailer and turning.
Figure 4:
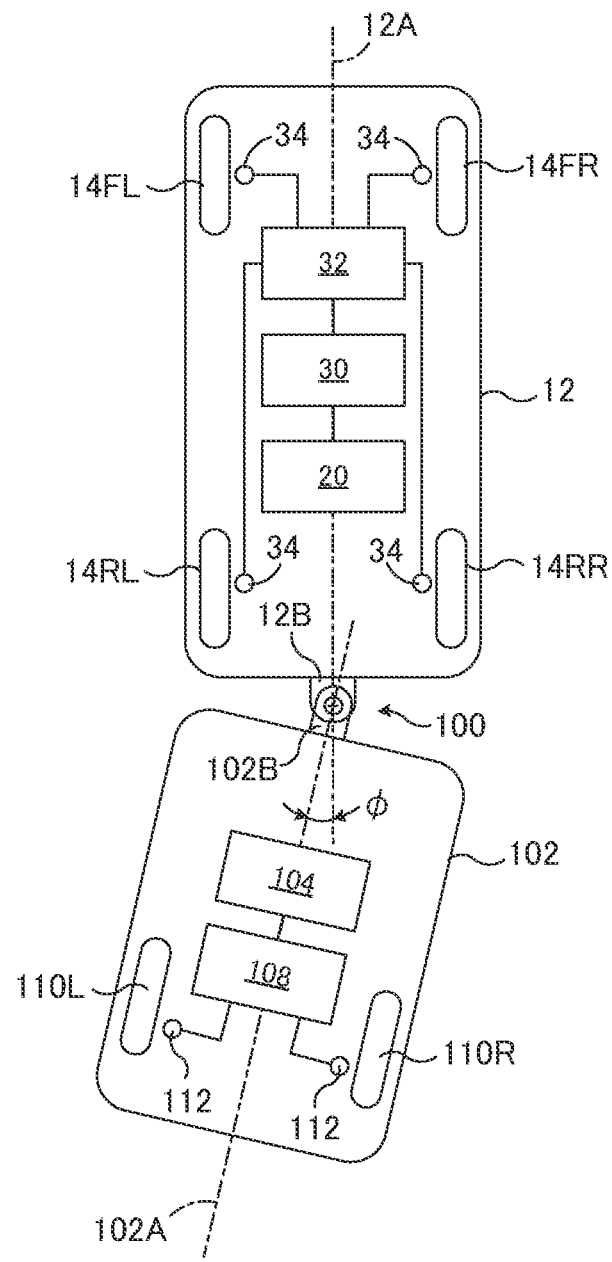
FIG. 4 is a diagram showing a situation in which a vehicle tows a trailer and finishes turning.

As shown in FIGS. 2 to 4, a front end bracket 102B of a trailer 102 can be connected to a rear end bracket 12B of the vehicle 12 by a joint 100. Therefore, the vehicle 12 functions as a tractor for towing the trailer 102 as needed. In FIGS. 2 to 4, a hitch angle φ, that is, an intersection angle of longitudinal center lines 12A and 102A of the vehicle 12 and the trailer 102 seen from above is shown.

As shown in FIG. 2, when the vehicle 12 and the trailer 102 are in the straight-ahead state, the longitudinal center line 12A of the vehicle 12 and the longitudinal center line 102A of the trailer 102 are aligned with each other, and a center of the joint 100 is located on these longitudinal centerlines. On the other hand, as shown in FIG. 3, when the vehicle 12 and the trailer 102 are in a turning state, the longitudinal center line 12A of the vehicle 12 and the longitudinal center line 102A of the trailer 102 intersect each other and the center of the joint 100 is located on an intersection of these longitudinal centerlines.

A brake ECU 104 is mounted on the trailer 102, and a brake ECU 104 is configured to be electrically connected to the collision avoidance support ECU 20 via a connector 106 and the CAN (not shown) as shown in FIG. 1. The traction sensor 92 may be a switch that turns on when the collision avoidance support ECU 20 and the brake ECU 104 are electrically connected by the connector 106. The hitch angle sensor 94 detects a hitch angle φ, that is, an intersection angle of the longitudinal center lines 12A and 102A seen from above. The hitch angle φ becomes a positive value when the vehicle 12 turns to the left.

Information (referred to as sensor information) detected by the traveling state sensor 70, the operation state sensor 80, the traction sensor 92, and the hitch angle sensor 94 is supplied to the collision avoidance support ECU 20 at a predetermined cycle via the CAN (not shown).

A brake actuator 32 is connected to the brake ECU 30. The brake actuator 32 is provided in the hydraulic circuit between a master cylinder (not shown) that pressurizes hydraulic oil by a pedaling force applied to a brake pedal (not shown) and friction brake mechanisms 34 provided on the left and right front wheels 14FL and 14FR and the left and right rear wheels 14RL and 14RR. Each friction brake mechanism 34 includes a brake disc 34a that rotates with the corresponding wheel and a brake caliper 34b supported by a vehicle body (not shown). The brake actuator 32 adjusts a hydraulic pressure supplied to a wheel cylinder built in each brake caliper 34b in response to an instruction from the brake ECU 30, and the hydraulic pressure presses brake pads (not shown) against the brake disc 34a to generate a frictional braking force.

The brake ECU 30 calculates a driver-required deceleration based on a pedal effort or a master cylinder pressure detected by the brake operation amount sensor, and controls the operation of the brake actuator 32 so that the vehicle 12 decelerates at the driver-required deceleration. Further, when the brake ECU 30 receives a PCS brake command from the collision avoidance support ECU 20, the brake ECU 30 controls the operation of the brake actuator 32 so that the vehicle 12 decelerates at a PCS required deceleration which is an information included in the PCS brake command.

When the brake pedal is operated by the driver in a situation where the brake ECU 30 is receiving the PCS brake command, the brake ECU 30 adopts a required deceleration having a larger absolute value among the driver-required deceleration and the PCS-required deceleration as a final required deceleration. The brake ECU 30 controls the operation of the brake actuator 32 so that the vehicle 12 decelerates at the final required deceleration. That is, the brake ECU 30 executes a brake override control.

The brake ECU 30 performs anti-skid control (hereinafter referred to as "ABS control") in a manner known in the art. That is, the brake ECU 30 calculates braking slip rates of the wheels based on the wheel speeds Vwi (i=fl, fr, rl and rr) of the left and right front wheels 14FL and 14FR and the left and right rear wheels 14RL and 14RR detected by the wheel speed sensors included in the traveling state sensor 70. Further, when the braking slip ratio of any of the wheels exceeds a control start reference value, the brake ECU 30 controls the braking force of the wheel so that the braking slip ratio of the wheel is within a predetermined range until a preset control end condition is satisfied.

A brake actuator 108 is connected to the brake ECU 104. The brake actuator 108 is provided in a hydraulic circuit between a hydraulic source (not shown) for supplying high-pressure hydraulic oil and friction brake mechanisms 112 provided on a left wheel 110L and a right wheel 110R. Each friction brake mechanism 112 is configured in the same manner as the frictional brake mechanism 34, and is controlled by the brake ECU 104 so that a friction braking force corresponding to the driver required deceleration or the PCS required deceleration is generated.

An engine actuator 42 is connected to the engine ECU 40. The engine actuator 42 is an actuator for changing an operating state of an engine 44 (internal combustion engine), and includes, for example, a throttle valve actuator for changing an opening degree of a throttle valve. The engine ECU 40 calculates a driver-required driving force based on an amount of depression of an accelerator pedal detected by an accelerator operation amount sensor, and controls an operation of the engine actuator 42 so that a driving force (actual driving force) of the vehicle 12 approaches the driver-required driving force.

When the engine ECU 40 receives a driving force limiting command from the collision avoidance support ECU 20, the engine ECU controls the operation of the engine actuator 42 so as to suppress an output torque (driving force of the vehicle 12) generated by the engine 44. Notably, when the vehicle is an electric vehicle, the engine actuator 42 is a drive device for an electric motor, and when the vehicle is a hybrid vehicle, the engine actuator 42 is a drive device for an engine actuator and an electric motor.

A display 52 and a brake lamp 54 are connected to the meter ECU 50. The meter ECU 50 displays information related to the collision avoidance support on the display 52 according to the display command from the collision avoidance support ECU 20. The display 52 may be, for example, a head-up display or a multi-information display for displaying meters and various information.

<PCS Control>

Next, PCS control will be described. The collision avoidance support ECU 20 determines the possibility that the own vehicle 12 collides with a three-dimensional object in front of the vehicle based on the information about the three-dimensional object supplied from the obstacle detection device 60 and a vehicle state detected by the traveling state sensor 70. For example, the collision avoidance support ECU 20 determines if there is a possibility of collision with a three-dimensional object when the object maintains a current moving state (when the three-dimensional object is a stationary object, a stopped state) and the own vehicle maintains a current running state. When the collision avoidance support ECU 20 determines that the own vehicle may collide with the three-dimensional object, the collision avoidance support ECU recognizes the three-dimensional object as an obstacle.

When the collision avoidance support ECU 20 detects an obstacle, the collision avoidance support ECU calculates a collision prediction time TTC, which is a predicted time until the own vehicle 12 collides with the obstacle. The collision prediction time TTC is calculated by the following equation (1) based on a distance Dr between the obstacle and the own vehicle and a relative speed Vr of the own vehicle with respect to the obstacle. The collision prediction time TTC is an index showing a high possibility that the own vehicle collides with an obstacle, and the smaller the value, the higher the possibility (risk) that the own vehicle collides with the obstacle.

$$TTC=Dr/Vr \quad (1)$$

In the PCS control of the present embodiment, a level of possibility that the own vehicle 12 collides with an obstacle is divided into two stages based on the collision prediction time TTC. When the collision prediction time TTC drops below a warning threshold TTCw (a positive constant), the collision avoidance support ECU 20 determines that the level of the possibility that the own vehicle collides with the obstacle has reached a first stage, and uses the display 52 and the alarm device 90 to give alarms to a driver.

When the collision prediction time TTC further decreases and becomes equal to or smaller than an operating threshold TTCa (a positive constant smaller than TTCw), the collision avoidance support ECU 20 determines that the level of the possibility that the own vehicle 12 collides with the obstacle has reached a second stage, and starts an automatic brake control. In this connection, the collision avoidance support ECU 20 transmits a PCS brake command to the brake ECU 30. The PCS brake command contains information representing a PCS required deceleration Gpcs.

The PCS request deceleration Gpcs is calculated as follows. For example, taking a case where an obstacle is stopped, and representing a speed (=relative speed) of the own vehicle at a present time by V, a deceleration of the own vehicle by Gb (<0), and a time until the own vehicle stops by t, a mileage X until the own vehicle stops can be expressed by the following equation (2).

$$X=V \cdot t-(\tfrac{1}{2}) \cdot Gb \cdot t^2 \quad (2)$$

Further, the time t until the own vehicle stops can be expressed by the following equation (3).

$$t=-V/Gb \quad (3)$$

Therefore, by substituting the time t represented by the equation (3) into the time t of the equation (2), the mileage X until the own vehicle stops can be expressed by the following equation (4).

$$X=-V^2/(2Gb) \quad (4)$$

In order to stop the vehicle in front of the obstacle by a distance β, the deceleration Gb may be calculated by setting the mileage X to a distance (Ds−β) obtained by subtracting the distance β(>0) from a distance Ds detected by the obstacle detection device 60. Notably, when an obstacle is traveling, the mileage X may be calculated using a relative speed and a relative deceleration with the obstacle.

The PCS required deceleration Gpcs is set to a sign inversion value of the deceleration Gb calculated in the above way. An upper limit value Gmax (>0) is set for the PCS request deceleration Gpcs, and if the calculated magnitude (absolute value) of the PCS request deceleration Gpcs exceeds the upper limit value Gmax, the magnitude of the deceleration Gpcs is set to the upper limit Gmax.

Upon receiving the PCS brake command, the brake ECU 30 controls the brake actuator 32 so that a deceleration of the own vehicle 12 becomes the PCS required deceleration Gpcs. As a result, frictional braking forces are generated on the front and rear wheels without requiring the driver to operate the brake pedal, and the own vehicle can be forcibly decelerated. As described above, the automatic brake control is a control in which frictional braking forces are generated on the front and rear wheels by a PCS brake command to decelerate the own vehicle. Notably, when the vehicle tows a trailer, friction braking forces may be generated on the left and right wheels of the trailer by a PCS brake command to decelerate the trailer.

The collision avoidance support ECU 20 determines whether or not the collision prediction time TTC becomes larger than an end threshold value TTCb (a positive constant larger than TTCw) by the automatic brake control. Since the end threshold TTCb is larger than TTCw, it is a value larger than the operating threshold TTCa. Therefore, the collision avoidance support ECU 20 monitors whether or not the possibility of collision between the own vehicle 12 and the obstacle is low (whether or not the collision can be avoided). When the collision avoidance support ECU 20 determines that the possibility of collision between the own vehicle and the obstacle is low, the collision avoidance support ECU terminates the transmission of the PCS brake command. As a result, the automatic brake control terminates and the PCS control terminates. Further, the collision avoidance support ECU 20 terminates the transmission of the PCS brake command when the own vehicle is stopped by the automatic brake control. As a result, the automatic brake control terminates.

The collision avoidance support ECU 20 transmits a stop holding command to the brake ECU 30 after the automatic brake control is completed. While receiving the stop holding command, the brake ECU 30 controls the brake actuator 32 to supply a hydraulic pressure set for a stop holding to the wheel cylinders of the friction brake mechanism 34 of the front and rear wheels. As a result, a stopped state of the own vehicle is maintained so that the own vehicle does not move forward or backward (stop holding control). The collision avoidance support ECU 20 stops the transmission of the stop holding command when a cancellation condition of the stop holding control is satisfied. Thus, the supply of the hydraulic pressure to each wheel cylinder is terminated, and the stop holding state of the own vehicle is released.

The release condition of the stop holding control is satisfied when either a release condition 1 or a release condition 2 is satisfied. For example, the release condition 1 is that a duration of the stop holding state of the own vehicle reaches a set time, and the release condition 2 is that a depressing operation of the brake pedal is detected.

The collision avoidance support ECU 20 terminates a driving force limit command for limiting an engine output torque (for example, making the engine output torque zero) to the engine ECU 40 while the automatic brake control is being executed and the own vehicle is held in the stopped state. Therefore, even if the driver operates an accelerator pedal while the automatic brake control is being executed, a driving force required by the driver is ignored, and the own vehicle does not accelerate according to the accelerator pedal operation. The control for holding the own vehicle in the stopped state is referred to as a stop holding control.

In particular, in the embodiment, as will be described in detail later, even if an obstacle is detected in front of the vehicle 12, if it is determined that the following prohibition conditions 1 to 3 are satisfied for a predetermined time or longer, that is, it is determined that a jackknifing phenomenon may occur, the automatic brake control by the PCS control is prohibited. If the automatic brake control by the PCS control has already been executed, the automatic brake control terminates.

Prohibition condition 1: Vehicle 12 is towing the trailer.
Prohibition condition 2: An absolute value of the hitch angle is equal to or larger than the reference value (pc (a positive constant).
Prohibition condition 3: The coefficient of friction of the road surface is lower than the standard value, that is, the coefficient of friction of the standard road surface (for example, a dry asphalt road surface).

<PCS Control Routine>

Figure 5:
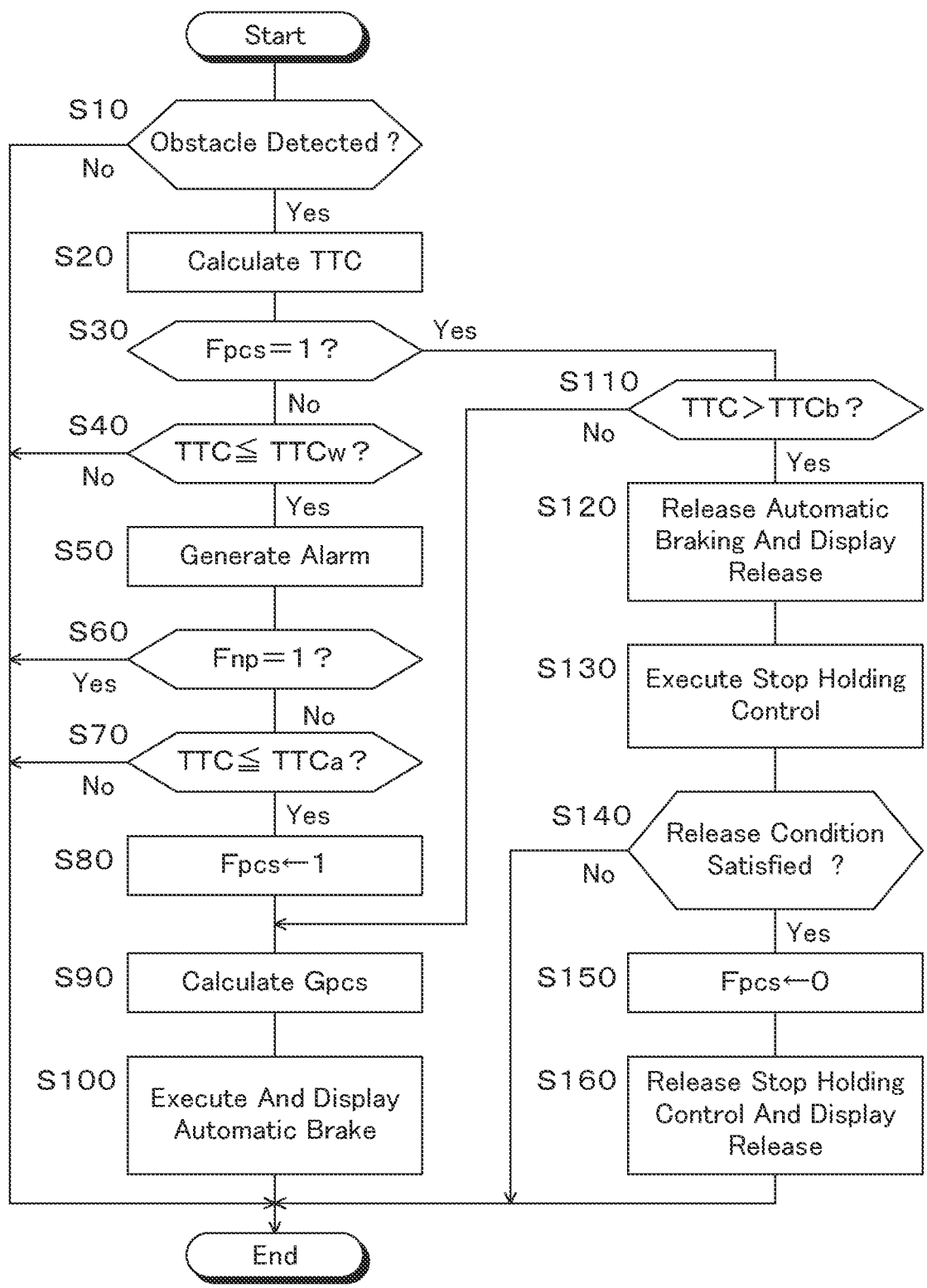
FIG. 5 is a flowchart showing a PCS control routine in the embodiment.

Next, the PCS control routine in the embodiment will be described with reference to the flowchart shown in FIG. 5. The control according to the flowchart shown in FIG. 5 is repeatedly executed by the CPU of the collision avoidance support ECU 20 at predetermined time intervals when an ignition switch (not shown) is on.

First, in step S10, the CPU determines whether or not the obstacle detection device 60 has detected an obstacle in front of the vehicle 12. When a negative determination is made, the CPU temporarily terminates the PCS control, and when an affirmative determination is made, in step S20 the CPU calculates a collision prediction time TTC as described above.

In step S30, the CPU determines whether or not a flag Fpcs is 1, that is, whether or not the automatic brake control by the PCS control is being executed. When an affirmative determination is made, the CPU advances the PCS control to step S110, and when a negative determination is made, the CPU advances the PCS control to step S40. The flag Fpcs is initialized to 0 prior to step S10 at the start of control according to the flowchart shown in FIG. 2.

In step S40, the CPU determines whether or not the collision prediction time TTC is equal to or smaller than the alarm threshold value TTCw, that is, whether or not it is necessary to generate an alarm. When a negative determination is made, the CPU temporarily terminates the PCS control, and when an affirmative determination is made, in step S50 the CPU activates the alarm device 90 to generate an alarm that the vehicle may collide with the obstacle.

In step S60, the CPU determines whether or not a flag Fnp is 1, that is, whether or not the execution of the automatic brake control by the PCS control is prohibited in a situation where the vehicle 12 is not towing a trailer. When an affirmative determination is made, the CPU temporarily terminates the PCS control, and when a negative determination is made, the CPU advances the PCS control to step S65. When an affirmative determination is made in this step or in step S65 described later, step S100 described later is not executed. Therefore, if the automatic brake control by PCS control has already been executed, the automatic brake control is finished.

In step S70, the CPU determines whether or not the collision prediction time TTC is equal to or smaller than the operating threshold value TTCa, that is, whether or not the automatic brake control is necessary. When a negative determination is made, the CPU temporarily terminates the PCS control, and when an affirmative determination is made, in step S80 the CPU sets the flag Fpcs to 1.

In step S90, the CPU calculates a PCS required deceleration Gpcs as described above, and in step S100, the CPU issues a PCS brake command to the brake ECU 30 to change a deceleration of the vehicle 12 to the PCS required deceleration Gpcs. Therefore, the brake actuator 32 is controlled by the brake ECU 30 so that the deceleration of the vehicle 12 becomes the PCS required deceleration Gpcs. Further, the CPU displays on the display 52 that the automatic brake control is being executed.

In step S110, the CPU determines whether or not the collision prediction time TTC is larger than the end threshold value TTCb. When a negative determination is made, the CPU advances the PCS control to step S90, and when an affirmative determination is made, the CPU advances the PCS control to step S120.

In step S120, the CPU releases the automatic brake control and displays on the display 52 that the automatic brake control has been released, and in step S130, the CPU executes the stop holding control as described above. If the automatic brake control is already released, step S120 is skipped.

In step S140, the CPU determines whether or not the above-mentioned release condition 1 or 2 of the stop holding control is satisfied. When a negative determination is made, the CPU temporarily terminates the PCS control, and when an affirmative determination is made, the CPU resets the flag Fpcs to 0 in step S150, releases the alarm and the stop holding control in step S160, and displays on the display 52 that the stop holding control has been released.

<Non-Execution Control Routine of Automatic Brake Control>

Figure 6:
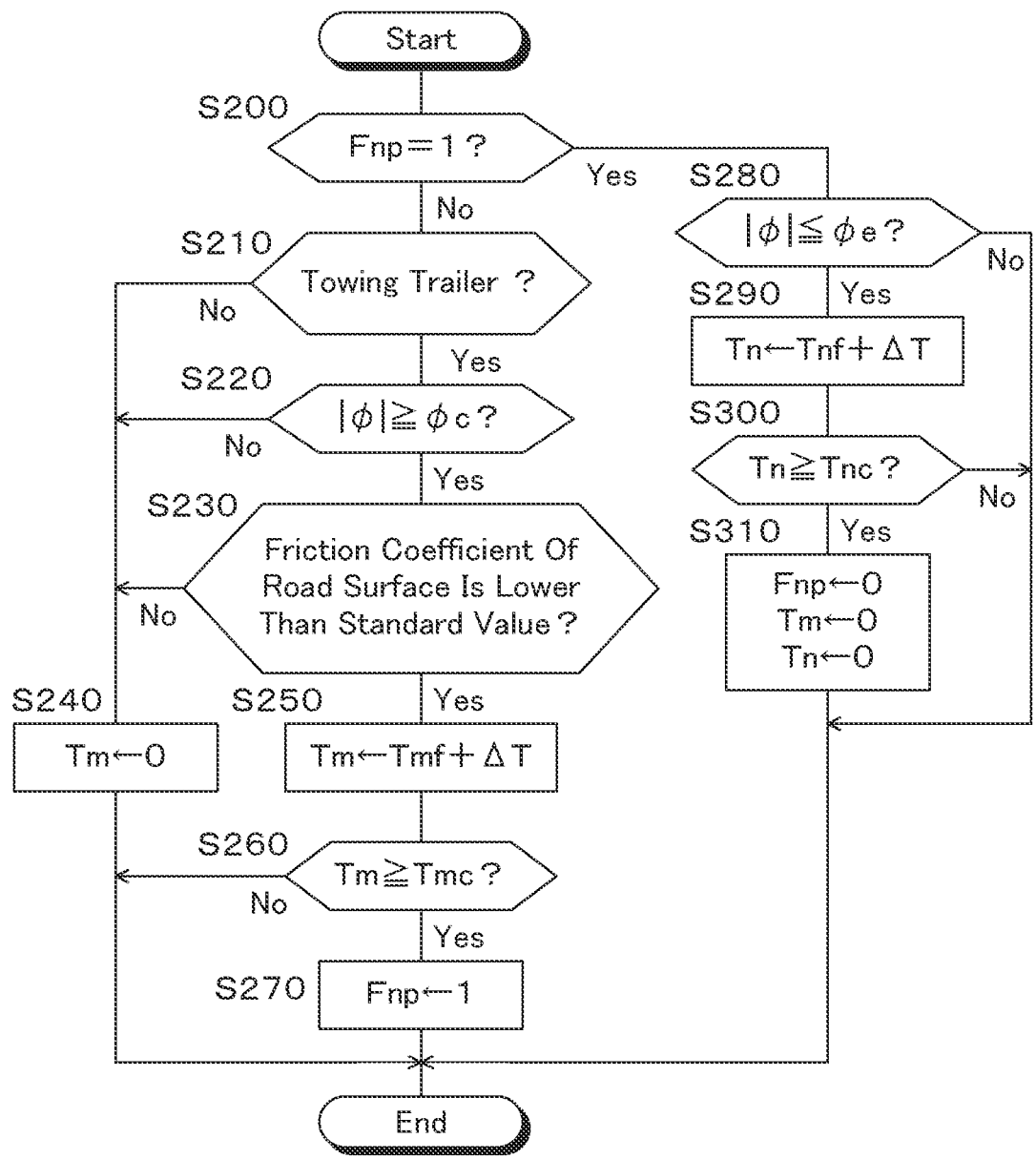
FIG. 6 is a flowchart showing a non-execution control routine of the automatic brake control by the PCS control in the embodiment.

Next, the non-execution control routine of the automatic brake control by the PCS control in the embodiment will be described with reference to the flowchart shown in FIG. 6. The control according to the flowchart shown in FIG. 6 is repeatedly executed by the CPU of the collision avoidance support ECU 20 at predetermined time intervals when the ignition switch (not shown) is on. In the following description, the non-execution control of the automatic brake control according to the flowchart shown in FIG. 6 is simply referred to as "non-execution control". A flag Fnp and the timer count value Tm are initialized to 0 at the start of the non-execution control according to the flowchart shown in FIG. 6.

First, in step S200, the CPU determines whether or not the flag Fnp is 1, that is, whether or not the automatic brake control by PCS control is already prohibited. When an affirmative determination is made, the CPU advances the non-execution control to step S280, and when a negative determination is made, the CPU advances the non-execution control to step S210.

In step S210, the CPU determines whether or not the vehicle 12 is towing a trailer based on the detection result of the traction sensor 90. When a negative determination is made, the CPU advances the non-execution control to step S240, and when an affirmative determination is made, the CPU advances the non-execution control to step S220.

In step S220, the CPU determines whether or not an absolute value of the hitch angle φ detected by the hitch angle sensor 92 is equal to or larger than a reference value φc (a positive constant). When a negative determination is made, the CPU advances the non-execution control to step S240, and when an affirmative determination is made, the CPU advances the non-execution control to step S230.

In step S230, the CPU determines whether or not the friction coefficient of the road surface is lower than the standard value. When a negative determination is made, the CPU resets the timer count value Tm to 0 in step S240, and when an affirmative determination is made, the CPU advances the non-execution control to step S250. In this step, when two or more wheels excluding the combination of only the left and right front wheels are under ABS control and an absolute value of the longitudinal acceleration Gx of the vehicle 12 is equal to or lower than a reference value Gxm (a positive constant), the friction coefficient of the road surface may be determined to be lower than the standard value.

The two or more wheels except the combination of the left and right front wheels are the left front wheel and the right rear wheel, the right front wheel and the left rear wheel, the left and right rear wheels, the left front wheel and the left and right rear wheels, or the right front wheel and the left and right rear wheels. In some embodiments, they include two wheels in diagonal positions. The combination of left and right front wheels is excluded because the following points are taken into consideration. That is, when the vehicle 12 tows a trailer, the vehicle receives a rearward force from the trailer, a rearward moment acts on the vehicle around ground contact points of the rear wheels, and ground contact loads of the left and right front wheels decreases. Therefore, the front wheels are more likely to be ABS controlled than the rear wheels. As a result, when a friction coefficient of a road surface is determined based on whether the left and right front wheels are under ABS control, even though the coefficient of friction of the road surface is not lower than the standard value, it may be erroneously determined that the friction coefficient of the road surface is lower than the standard value.

In step S250, the CPU updates the timer count value Tm to Tmf+ΔT, with Tmf as a previous value of the timer count value Tm and ΔT as a cycle time of the flowchart shown in FIG. 3.

In step S260, the CPU determines whether or not the timer count value Tm is equal to or larger than a reference value Tmc (a positive constant of about 0.5 seconds). When a negative determination is made, the CPU temporarily terminates the non-execution control, and when an affirmative determination is made, in step S270 the CPU sets the flag Fnp to 1.

In step S280, the CPU determines whether or not an absolute value of the hitch angle φ detected by the hitch angle sensor 92 is equal to or smaller than a reference value φe (a positive constant smaller than φc). When a negative determination is made, the CPU temporarily terminates the non-execution control, and when an affirmative determination is made, the CPU advances the non-execution control to step S290.

In step S290, the CPU updates the timer count value Tn to Tnf+ΔT, with Tnf as a previous value of the timer count value Tn.

In step S300, the CPU determines whether or not the timer count value Tn is equal to or larger than a reference value Tnc (a positive constant of about 3 seconds). When a negative determination is made, the CPU temporarily terminates the non-execution control, and when an affirmative determination is made, in step S310 the CPU resets the flag Fnp to 0 and resets the timer count values Tm and Tn to 0.

As can be seen from the above descriptions, according to the embodiment, when an obstacle is detected in front of the vehicle 12 by the obstacle detection device 60 (step S10), warning is executed as necessary by the PCS control. That is, when a collision prediction time TTC is calculated (step S20) and the collision prediction time TTC is equal to or smaller than the warning threshold TTCw (step S40), the warning device 90 is activated to generate an alarm to the effect that the vehicle may collide with the obstacle (step S50). Since the warning is also issued when the vehicle 12 is towing a trailer, it is possible to call attention that the vehicle may collide with an obstacle, and a driver can perform collision avoidance steering as necessary.

As described above, the flag Fnp is set to 1 when it is determined that the above prohibition conditions 1 to 3 are satisfied for the predetermined time or longer, that is, when a jackknifing phenomenon may occur. When the flag Fnp is 0 (step S60), the automatic brake control by the PCS control (steps S70 to S100) is executed as needed. That is, when the collision prediction time TTC is equal to or smaller than the operating threshold value TTCa (step S70), the required deceleration Gpcs for avoiding the vehicle 12 from colliding with an obstacle is calculated (step S90), and the automatic brake control is executed so that the deceleration of the vehicle 12 becomes the PCS required deceleration Gpcs (step S100). Therefore, even when the vehicle 12 is towing a trailer, it is possible to prevent the vehicle from colliding with an obstacle by the automatic brake control.

Further, when the flag Fnp is 1 (step S60), the automatic brake control by the PCS control (steps S70 to S100) is not executed. Therefore, when the vehicle 12 is towing a trailer and there is a possibility that the jackknifing phenomenon may occur, the automatic brake control is not executed, so that it is possible to prevent the jackknifing phenomenon from occurring due to the automatic brake control.

In particular, according to the embodiment, when it is determined that the vehicle 12 is towing a trailer 102, the magnitude of the hitch angle $\varphi$ is equal to or larger than the hitch angle reference value $\varphi c$, and the friction coefficient of the road surface is lower than the standard value (steps S210 to S230), the automatic brake control is prohibited (step S270). Therefore, when the vehicle is going straight, which is unlikely to cause the jackknifing phenomenon, it is possible to avoid a collision with an obstacle by decelerating the vehicle by the automatic brake control, and when the vehicle is turning, it is possible to avoid the jackknifing phenomenon caused by the deceleration of the vehicle by the automatic brake control.

Further, the hitch angle $\varphi$ is not estimated based on, for example, the steering angle $\theta$, but is detected by the hitch angle sensor 92. Therefore, not only when the vehicle 12 and the trailer 102 are turning, but also when the vehicle 12 is returning to straight running but the trailer 102 is still turning, as shown in FIG. 4, it is possible to avoid the jackknifing phenomenon caused by the deceleration of the vehicle due to the automatic brake control.

Further, according to the embodiment, when ABS control is executed on two or more wheels except the combination of only the left and right front wheels and the deceleration Gx of the vehicle 12 is lower than the reference value Gxm, it is determined that the friction coefficient of the road surface is lower than the reference value. Therefore, it is possible to prevent determination that the friction coefficient of the road surface is lower than the standard value from being erroneously made due to the determination of the friction coefficient of the road surface based on whether the left and right front wheels are under ABS control. Further, it is possible to reduce the possibility that the friction coefficient of the road surface is erroneously determined to be lower than the standard value; as compared to where the deceleration of the vehicle is not taken into consideration.

Further, according to the embodiment, it is determined whether ABS control is executed for two or more wheels except the combination of only the left and right front wheels, and the two or more wheels are at least two diagonal wheels, that is, the wheels including the left front wheel and the right rear wheel or the right front wheel and the left rear wheel. Therefore, compared to where the friction coefficient of the road surface is determined to be lower than the standard value when the ABS control is executed on the front and rear wheels on the left or right side, it is possible to determine whether or not the friction coefficient of the road surface is lower than the standard value for a wider road surface.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above-described embodiment, in step S220, it is determined whether or not an absolute value of the hitch angle $\varphi$ detected by the hitch angle sensor 94 is equal to or larger than the reference value $\varphi c$. However, step S220 may be omitted and when affirmative determinations are made in steps S210 and S230, the flag Fnp may be set to 1 and the automatic brake control by the collision avoidance support control may be prohibited.

Further, in the above-described embodiment, a hitch angle $\varphi$ is detected by the hitch angle sensor 94. However, the hitch angle $\varphi$ may be estimated based on a steering angle $\theta$, a yaw rate of the vehicle, and the like. In that case, even if an estimated value of the hitch angle becomes the reference value $\varphi c$ or smaller, the flag Fnp may be maintained at 1 for a predetermined time.

Further, in the above-described embodiment, in step S230, whether or not the friction coefficient of the road surface is lower than the standard value is determined by determining whether or not two or more wheels excluding the combination of only the left and right front wheels are under ABS control and an absolute value of the longitudinal acceleration Gx of the vehicle 12 is equal to or lower than the reference value Gxm. However, the determination of whether or not an absolute value of the longitudinal acceleration Gx of the vehicle 12 is equal to or lower than the reference value Gxm may be omitted.

Further, as described in Japanese Patent Application Laid-Open No. 2020-083168, International Publication No. WO 2019/073513, and Japanese Patent Application Laid-Open No. H08-121582, the determination whether or not the friction coefficient of the road surface is lower than the standard value may be carried out by any method known in the art.

Further, in the above-described embodiment, the vehicle 12 has a traction sensor 92, and in step S210, it is determined whether or not the vehicle 12 is towing a trailer based on the detection result of the traction sensor 92. However, whether or not the vehicle is towing a trailer may be determined based on the information behind the vehicle taken by a back camera. Alternatively, a weight of the vehicle may be estimated based on a relationship between a braking force of the vehicle and a deceleration, and it may be determined whether or not the estimated weight is larger than a weight of the vehicle alone. Further, these determinations may be combined.

Further, in the above-described embodiment, the trailer 102 includes the brake ECU 104, the brake actuator 108, and the friction brake mechanism 112. However, the collision avoidance support device and the collision avoidance support program of the present disclosure may be applied to a vehicle towing a trailer that is not provided with a brake ECU and the like.

Further, in the above-described embodiment, the stop holding control is performed in the collision avoidance support control. However, when an affirmative determination is made in step S110, steps S120 and S150 may be executed without executing steps S130, S140 and S160.

What is claimed is:
1. A collision avoidance support device for a vehicle that includes an obstacle detection device that detects an obstacle in front of a vehicle and an electronic control unit configured to perform automatic brake control to apply braking force automatically to the vehicle when it is determined that an obstacle is detected by the obstacle detection device and the vehicle may collide with the obstacle, wherein the electronic control unit is configured to prohibit the automatic brake control when it is determined that the vehicle is towing a trailer and a friction coefficient of a road surface is lower than a standard value.

2. The collision avoidance support device for a vehicle according to claim 1, wherein the electronic control unit is configured to prohibit the automatic brake control when it is determined that the vehicle is towing a trailer, a magnitude of a hitch angle is equal to or larger than a hitch angle reference value, and the friction coefficient of the road surface is lower than the standard value.

3. The collision avoidance support device for a vehicle according to claim 1, wherein the electronic control unit is configured to determine that the friction coefficient of the road surface is lower than the standard value when anti-skid control is executed on two or more wheels except a combination of only a left front wheel and a right front wheel and a deceleration of the vehicle is lower than a deceleration reference value, the friction coefficient of the road surface is higher than the standard value.

4. The vehicle collision avoidance support device for a vehicle according to claim 3, wherein the two or more wheels include at least two wheels in diagonal positions.

5. A collision avoidance support program for a vehicle that causes an electronic control unit mounted on a vehicle to execute a step of detecting an obstacle in front of the vehicle by an obstacle detection device and a step of performing automatic brake control that automatically applies braking force to the vehicle when it is determined that an obstacle is detected by the obstacle detection device and the vehicle may collide with the obstacle, wherein, the collision avoidance support program includes a step of determining whether the vehicle is towing a trailer, a step of determining whether a coefficient of friction of a road surface is lower than a standard value, and a step of prohibiting the automatic brake control when it is determined that the vehicle is towing a trailer and a friction coefficient of the road surface is lower than the standard value.

* * * * *